(12) United States Patent
Roybal (10) Patent No.: US 7,732,785 B2
(45) Date of Patent: Jun. 8, 2010

(54) RADIATION ANALYSIS DEVICES, RADIATION ANALYSIS METHODS, AND ARTICLES OF MANUFACTURE

(75) Inventor: Lyle Gene Roybal, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 175 days.

(21) Appl. No.: 11/943,369

(22) Filed: Nov. 20, 2007

(65) Prior Publication Data

US 2009/0224160 A1 Sep. 10, 2009

(51) Int. Cl.
*G01T 1/00* (2006.01)
(52) U.S. Cl. ...................................... 250/393
(58) Field of Classification Search ............. 250/393
See application file for complete search history.

(56) References Cited

U.S. PATENT DOCUMENTS

| 5,151,588 A | * | 9/1992 | Kiri et al. | ................ | 250/208.1 |
| 2004/0026623 A1 | * | 2/2004 | Doty et al. | ............. | 250/370.09 |

OTHER PUBLICATIONS

Website: http://en.wikipedia.org/w/index.php?title=Gamma_spectroscopy&printable=yes "Gamma spectroscopy" taken from Wikipedia, the free encyclopedia, Oct. 22, 2007, pp. 1-5.

\* cited by examiner

*Primary Examiner*—David P Porta
*Assistant Examiner*—Shun Lee
(74) *Attorney, Agent, or Firm*—TraskBritt (57) ABSTRACT

Radiation analysis devices include circuitry configured to determine respective radiation count data for a plurality of sections of an area of interest and combine the radiation count data of individual of sections to determine whether a selected radioactive material is present in the area of interest. An amount of the radiation count data for an individual section is insufficient to determine whether the selected radioactive material is present in the individual section. An article of manufacture includes media comprising programming configured to cause processing circuitry to perform processing comprising determining one or more correction factors based on a calibration of a radiation analysis device, measuring radiation received by the radiation analysis device using the one or more correction factors, and presenting information relating to an amount of radiation measured by the radiation analysis device having one of a plurality of specified radiation energy levels of a range of interest.

6 Claims, 5 Drawing Sheets

RADIATION ANALYSIS DEVICES, RADIATION ANALYSIS METHODS, AND ARTICLES OF MANUFACTURE

GOVERNMENT RIGHTS

This invention was made with government support under Contract No. DE-AC07-05-ID14517 awarded by the United States Department of Energy. The government has certain rights in the invention.

TECHNICAL FIELD

The present disclosure relates to radiation analysis devices, radiation analysis methods, and articles of manufacture.

BACKGROUND OF THE DISCLOSURE

Radioactive materials are common. Some radioactive materials may be hazardous to human life. Accordingly, some radioactive materials may need to be detected and located so the radioactive materials can be managed, thereby preventing exposure to human life. Since a selected radioactive material may emit gamma rays having a particular energy level at a known rate, the selected radioactive material may be detected using a device configured to receive a gamma ray and determine an energy level of the gamma ray. At least some aspects of the disclosure are directed towards apparatus and methods for detecting and/or analyzing radioactive materials.

BRIEF DESCRIPTION OF THE DRAWINGS

Preferred embodiments of the disclosure are described below with reference to the following accompanying drawings.

DETAILED DESCRIPTION

This disclosure of the invention is submitted in furtherance of the constitutional purposes of the U.S. Patent Laws "to promote the progress of science and useful arts." (Article 1, Section 8).

According to some embodiments of the disclosure, apparatus and methods for radiation detection and/or analysis are described. In one embodiment, radiation count data is used to detect a selected radioactive material within an area of interest. In another embodiment, radiation count data is analyzed for a radiation energy level range of interest. Calibration information affecting the range of interest is accounted for in analyzing the count data in one embodiment. Additional aspects of the disclosure are described in the illustrative embodiments below.

Radioactive materials may occur naturally or otherwise be present in an area of interest. It may be desired to detect whether one or more radioactive materials are present in an area of interest. One of the radioactive materials may be selected by a user and the selected radioactive material may be detected using a device configured to receive radiation from the selected radioactive material and determine an energy level of the radiation since the selected radioactive material emits radiation having a particular energy level at a known rate.

It may be desired to know if a particular amount, or more, of the selected radioactive material is present, for example, which may pose a risk to humans or is otherwise desired to be known. Accordingly, in one example, a particular amount of radioactive material desired to be known may be a threshold amount.

The particular amount may emit at least a predetermined amount of radiation within a particular amount of time. The particular amount of time is referred to herein as the detectable activity period of the selected radioactive material. In one embodiment, detecting the particular amount of the selected radioactive material within the area of interest may involve detecting radiation for a period of time at least as long as the detectable activity period.

In one embodiment, if an amount of radiation having the particular energy level detected during the detectable activity period is greater than the predetermined amount, the particular amount of the selected radioactive material may be present within the area of interest. Otherwise, the particular amount of the selected radioactive material is not likely to be present within the area of interest.

For a selected radioactive material, the length of the detectable activity period may vary based on the amount of the selected radioactive material being detected. Furthermore, the length of the detectable activity period may vary from one radioactive material to another.

During a detectable activity period, gamma rays (radiation) having an energy level falling within a detectable energy level range may be detected and counted. A histogram may be formed from this radiation count data. The histogram, which may also be referred to as a radiation spectrum, may provide information describing the number and energy levels gamma rays detected within a particular detectable activity period.

Figure 1:
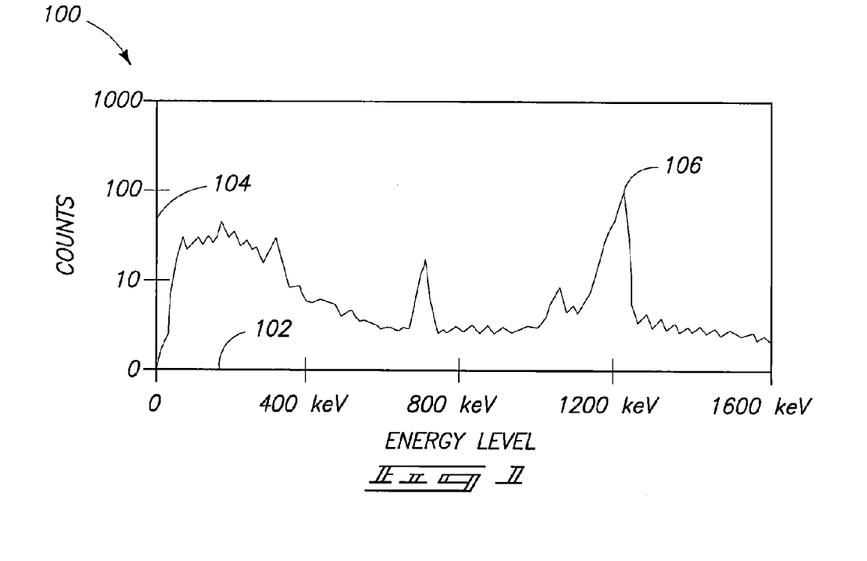
FIG. 1 is a chart illustrating radiation count data according to one embodiment.

Referring to FIG. 1, a chart 100 depicting a radiation spectrum, according to one embodiment, is illustrated. A first axis 102 of chart 100 represents energy levels of gamma rays detected by a radiation analysis device. Axis 102, in one embodiment, ranges from 0 kiloelectronvolts (keV) to 1600 keV. A second axis 104 of chart 100 represents a count of gamma rays having a particular energy level that are detected by the radiation analysis device. Axis 104, in one embodiment, ranges from 0 to 1000. By way of example, point 106 of chart 100 illustrates that approximately 100 gamma rays having an energy level of 1200 keV were received by the radiation analysis device during a particular detectable activity period. Chart 100 may be a useful way of illustrating radiation count data acquired over a particular detectable activity period.

Figure 2:
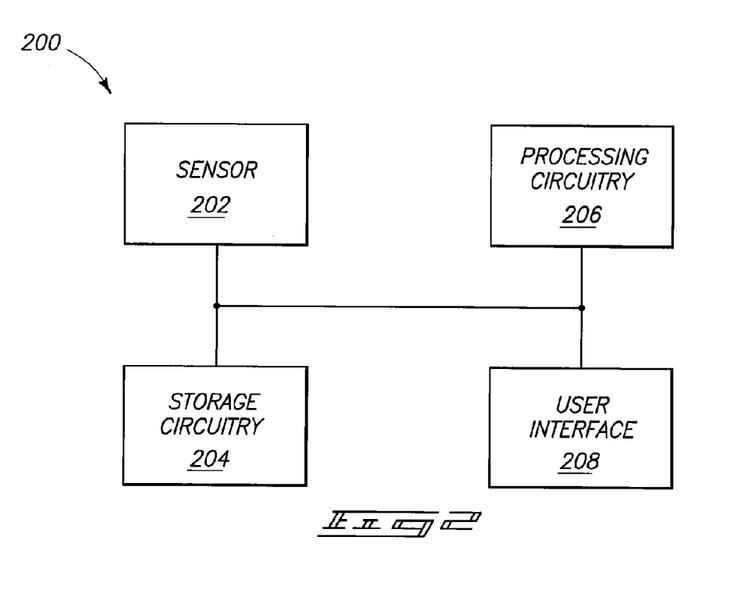
FIG. 2 is a block diagram of a radiation analysis device according to one embodiment.

Referring to FIG. 2, a block diagram of a radiation analysis device 200, according to one embodiment, is illustrated. The radiation analysis device includes, in one embodiment, a sensor 202, storage circuitry 204, processing circuitry 206, and a user interface 208. In some embodiments, the radiation analysis device may also include a positioning system (e.g., a global positioning system (GPS) receiver).

Sensor 202 may be a sensor capable of detecting a gamma ray and determining an energy level of the gamma ray. In one operational embodiment, radiation analysis device 200 may be moved along an area of the ground and sensor 202 may receive gamma rays emitted from radioactive material in the ground. By way of example, sensor 202 may be a sodium iodide detector, a germanium detector, or other type of detector capable of discriminating gamma ray energy levels in one embodiment.

Processing circuitry 206 may comprise circuitry configured to implement desired programming provided by appropriate media in at least one embodiment. For example, processing circuitry 206 may be implemented as one or more of a processor and/or other structure configured to execute executable instructions including, for example, software and/or firmware instructions, and/or hardware circuitry. Exemplary embodiments of processing circuitry 206 include hardware logic, PGA, FPGA, ASIC, state machines, and/or other structures alone or in combination with a processor. These examples of processing circuitry 206 are for illustration and other configurations are possible.

At least some embodiments or aspects described herein may be implemented using programming stored within appropriate processor-usable media and/or communicated via a network or other transmission media and configured to control appropriate processing circuitry. For example, programming may be provided via appropriate media including, for example, embodied within articles of manufacture, embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure or medium. Exemplary programming including processor-usable code may be communicated as a data signal embodied in a carrier wave in but one example.

Processing circuitry 206 may be configured to access radiation count data generated by sensor 202 indicative of detected gamma rays and which may be provided in sets in one embodiment. Each set of radiation count data of the plurality may indicate a number of gamma rays detected during a period of time and energy levels associated with the detected gamma rays. Processing circuitry 206 may further be configured to analyze the radiation count data to determine whether a selected radioactive material is present in an area of interest.

The radiation count data may be stored by storage circuitry 204. Processing circuitry 206 may access the radiation count data by retrieving the radiation count data from storage circuitry 204. Storage circuitry 204 may be embodied in a number of different ways using electronic, magnetic, optical, electromagnetic, or other techniques for storing information. Some specific examples of storage circuitry include, but are not limited to, a portable magnetic computer diskette, such as a floppy diskette, zip disk, hard drive, random access memory, read only memory, flash memory, cache memory, and/or other configurations capable of storing programming, data, or other digital information.

User interface 208 is configured to communicate information to a user and receive user inputs in one embodiment. User interface 208 may present information regarding radiation count data to a user in one example. In one embodiment, user interface 208 may provide radiation spectra, such as the radiation spectrum depicted in chart 100 to a user of radiation analysis device 200. In one embodiment, radiation analysis device 200 may be referred to as a radiation spectrometer.

Figure 3:
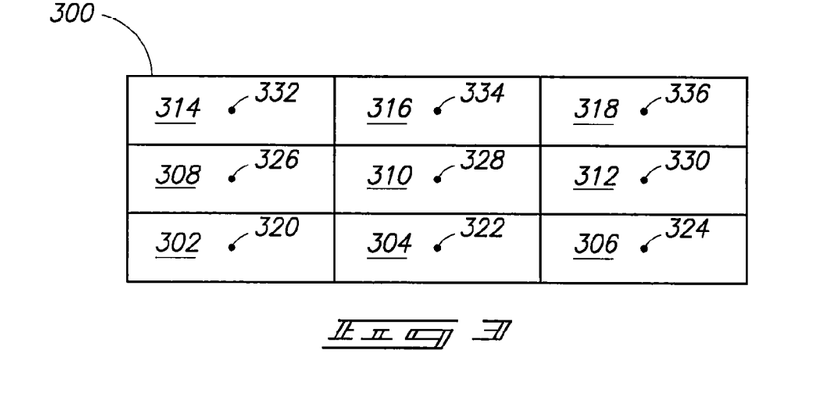
FIG. 3 is a chart illustrating an area of interest divided into portions according to one embodiment.

Referring to FIG. 3, an area of interest 300 (e.g., a portion of the surface of the earth) divided into portions 302, 304, 306, 308, 310, 312, 314, 316, and 318 associated respectively with positions 320, 322, 324, 326, 328, 330, 332, 334, and 336, according to one embodiment, is illustrated.

One method of determining whether a particular amount of a selected radioactive material is present in area of interest 300 is to traverse area of interest 300 in rows at a substantially steady rate with radiation analysis device 200. While traversing area of interest 300, radiation analysis device 200 may record radiation count data. In one embodiment, radiation analysis device 200 may traverse area of interest 300 so that radiation analysis device 200 is within each of portions 302, 304, 306, 308, 310, 312, 314, 316, and 318 for an amount of time substantially equal to the detectable activity period associated with the particular amount of the selected radioactive material.

In one embodiment, radiation analysis device 200 may determine a set of radiation count data for each of the portions of area of interest 300. Consequently, radiation analysis device 200 may determine nine different sets of radiation count data, each set being associated with a different one of the portions of area of interest 300 in the example of FIG. 3.

Furthermore, processing circuitry 206 may determine a different position (e.g., latitude and longitude) for each portion of area of interest 300. For example, processing circuitry 206 may determine position 320 and associate position 320 with portion 302. In one embodiment, processing circuitry 206 may determine the positions halfway through the detectable activity period. Accordingly, the positions may be determined in the middle of the portions of area of interest 300 as illustrated in FIG. 3. Processing circuitry 206 may alternatively determine the positions at some other point within the detectable activity period, for example, at the beginning or end of the detectable activity period. In one embodiment, a GPS receiver may be used to determine the positions.

According to this example method, processing circuitry 206 may examine the sets of radiation count data to determine whether the selected radioactive material is present in area of interest 300. By way of example, processing circuitry 206 may examine the set of radiation count data associated with portion 302 and determine that the set of radiation count data indicates the presence of the selected radioactive material in portion 302. Processing circuitry 206 may make this determination if the set of radiation count data includes a count of gamma rays having a particular energy level larger than a threshold value, the threshold value being associated with the particular amount of the selected radioactive material. Since position 320 is associated with portion 302, a user of radiation analysis device 200 may conclude that the selected radioactive material is near position 320.

Thus, according to this method, processing circuitry 206 may determine whether the selected radioactive material is present in area of interest 300 with a first resolution where the first resolution is related to the distance between the positions.

Figure 4:
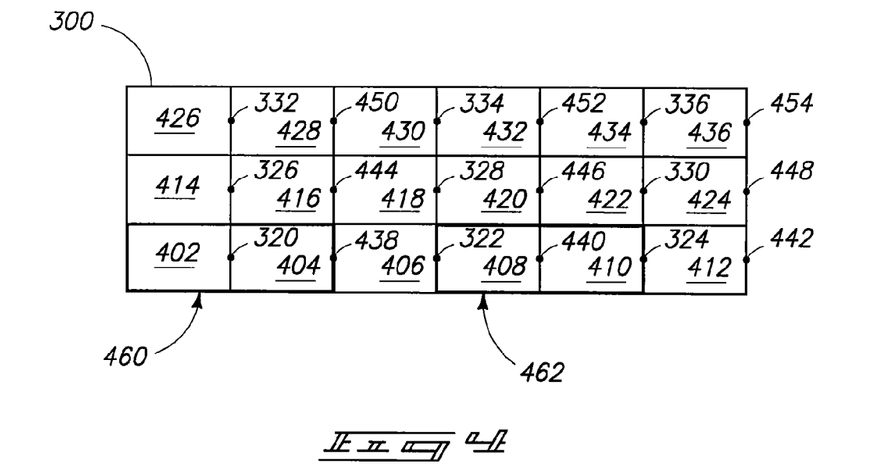
FIG. 4 is a chart illustrating an area of interest divided into sections according to one embodiment.

Referring to FIG. 4, a division of area of interest 300 into sections 402, 404, 406, 408, 410, 412, 414, 416, 418, 420, 422, 424, 426, 428, 430, 432, 434, and 436 associated respectively with positions 320, 438, 322, 440, 324, 442, 326, 444, 328, 446, 330, 448, 332, 450, 334, 452, 336, and 454, according to one embodiment, is illustrated.

Another method of determining whether a particular amount of a selected radioactive material is present in area of interest 300 is to traverse area of interest 300 in rows at a steady rate with radiation analysis device 200 so that radiation analysis device 200 is within each of sections 402, 404, 406, 408, 410, 412, 414, 416, 418, 420, 422, 424, 426, 428, 430, 432, 434, and 436 for an amount of time less than the detection activity period. For example, radiation analysis device 200 may be within individual sections for an amount of time equal to half of the detectable activity period associated with the particular amount of the selected radioactive material.

Radiation analysis device 200 may, in one embodiment, determine a set of radiation count data for each of the sections of area of interest 300. In the example of FIG. 4, radiation analysis device 200 may determine eighteen different sets of radiation count data, each set being associated with a different one of the sections of area of interest 300. The sets of radiation count data for the sections of area of interest 300 may be displayed as spectra.

Figure 5:
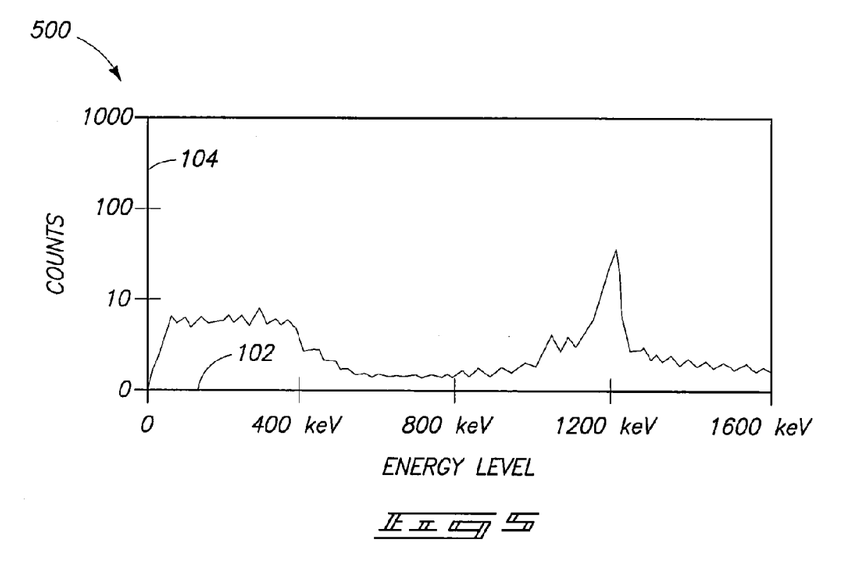
FIG. 5 is another chart illustrating radiation count data according to one embodiment.

Referring to FIG. 5, a chart 500 depicting a spectrum of a set of radiation count data for section 402 according to one embodiment is illustrated. Chart 500, like chart 100 discussed above in relation to FIG. 1, uses first axis 102 (representing energy levels) and second axis 104 (representing counts of gamma rays). Chart 500 is similar in appearance to chart 100. However, chart 500 indicates a lower total number of gamma rays received than chart 100 (i.e., the area under the curve of chart 100 is greater than the area under the curve of chart 500). One reason for the lower total number of gamma rays in chart 500 may be that chart 500 illustrates a set of radiation count data collected over a period of time half as long as the period of time over which the set of radiation count data illustrated in chart 100 was collected.

Figure 6:
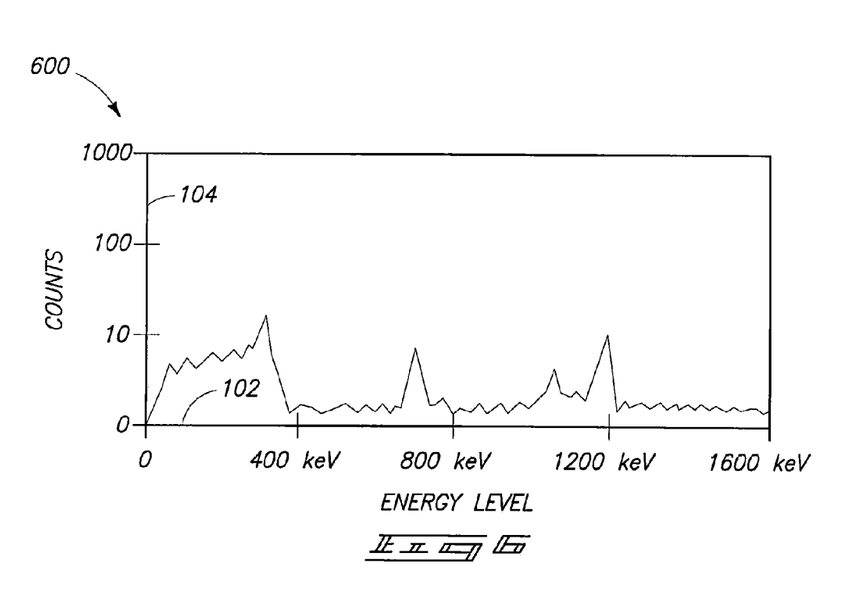
FIG. 6 is another chart illustrating radiation count data according to one embodiment.

Referring to FIG. 6, a chart 600 depicting a spectrum of a set of radiation count data for section 404 according to one embodiment is illustrated. Chart 600, like charts 100 and 500 discussed above, uses first axis 102 (representing energy levels) and second axis 104 (representing counts of gamma rays). Like chart 500, chart 600 is similar in appearance to chart 100, but indicates a lower total number of gamma rays received than chart 100.

Returning now to FIG. 4, processing circuitry 206 may determine a different position for each of the sections of area of interest 300. For example, processing circuitry 206 may determine position 438 and associate position 438 with portion 404. As is illustrated in FIG. 4, processing circuitry 206 may determine the positions at the end of half of the detectable activity period (i.e., the positions are determined at the right-hand end of the sections). Of course, as was discussed above, processing circuitry 206 may determine the positions at some other point within the half of the detectable activity period.

According to this method, processing circuitry 206 may examine the sets of radiation count data to determine whether the selected radioactive material is present in area of interest 300. However, since each set of radiation count data is collected over only half of the detectable activity period in this example, radiation analysis device 200 may use two sets of radiation count data to determine whether the selected radioactive material is present.

If processing circuitry 206 were to use only one of the sets of radiation count data associated with the sections of FIG. 4 to determine whether the selected radioactive material is present, processing circuitry 206 may determine that the selected radioactive material is not present when in fact it is present since a single set of radiation count data, in this example, is collected for only half of the detectable activity period.

However, combining two sets of radiation count data together, each set having been collected over half of the detectable activity period, results in a single combined set of radiation count data collected over a detectable activity period. Accordingly, processing circuitry 206 may use the single combined set of radiation count data to determine whether the selected radioactive material is present. In the described embodiment, the sections correspond to half the detection activity period and accordingly two sets are added in the described embodiments. More sets may be added in other examples where more than two sections correspond to a detection activity period.

By way of example, processing circuitry 206 may combine the set of radiation count data associated with section 402 and the set of radiation count data associated with section 404, as indicated by box 460. In one embodiment, processing circuitry 206 may combine the two sets of radiation count data by adding corresponding counts from the two sets of radiation count data together for particular energy levels. For example, the count information of energy levels of chart 500 may be added to the count information of respective energy levels of chart 600 to create a new radiation spectrum. By way of example, chart 100 may illustrate the addition of charts 500 and 600.

Processing circuitry 206 may determine that the combined set of radiation count data indicates the presence of the selected radioactive material. As was described above, processing circuitry 206 may make this determination because, for example, the combined set of radiation count data includes a count of gamma rays having a particular energy level such that the count is larger than a threshold value, the threshold value being associated with the particular amount of the selected radioactive material. Since position 320 is between sections 402 and 404, a user of radiation analysis device 200 may conclude that the selected radioactive material is near position 320.

Processing circuitry 206 may similarly combine sets of radiation count data for other sections of FIG. 4. For example, processing circuitry 206 may combine the set of radiation count data associated with section 404 with the set of radiation count data associated with section 406 and associate the combined set of radiation count data with position 438.

Note that the set of radiation count data associated with section 404 may be combined with the set of radiation count data associated with section 402 in determining a combined set of radiation count data for position 320. The set of radiation count data associated with section 404 may alternatively or additionally be combined with the set of radiation count data associated with section 406 in determining a combined set of radiation count data for position 438. Accordingly, a single set of radiation count data associated with one of the sections of FIG. 4 may be used in creating more than one combined set of radiation count data.

Thus, according to this method, processing circuitry 206 may determine whether the selected radioactive material is present in area of interest 300 with a second resolution where the second resolution is related to the distance between the positions of FIG. 4. Notice that the second resolution is greater than the first resolution described above in relation to FIG. 3 because the distance between the positions of FIG. 4 is half the distance between the positions of FIG. 3. Consequently, the method described above in relation to FIG. 4 may be used to more precisely locate the selected radioactive material when compared with the method described above in relation to FIG. 3.

For example, if the selected radioactive material is located very near position 440 of FIG. 4, processing circuitry 206 may detect the selected radioactive material by combining the sets of radiation count data associated with sections 408 and 410 (as indicated by box 462) and determine that the selected radioactive material is near position 440. In contrast, using the method described above in relation to FIG. 3, processing circuitry 206 may detect the selected radioactive material by examining the set of radiation count data associated with portion 304 and may determine that the selected radioactive material is near position 322. Or, processing circuitry 206 may detect the selected radioactive material by examining the set of radiation count data associated with portion 306 and may determine that the selected radioactive material is near position 324. In either case, the determination will be off by half the length of a portion.

Further, a radiation analysis device performing the method described in relation to FIG. 3 might not detect the selected radioactive material because in some cases, the set of radiation count data associated with section 304 may have a high count related to the selected radioactive material, but not high enough to detect the selected radioactive material. The high count may be due to gamma rays detected towards the right-hand end of portion 304. Similarly, the data set associated with section 306 may have a high count related to the selected radioactive material, but not high enough to detect the selected radioactive material. The high count may be due to gamma rays detected towards the left-hand end of portion 304. In this case, processing circuitry 206 might not detect the selected radioactive material based on the method described above in relation to FIG. 3, but may detect the selected radioactive material based on the method described above in relation to FIG. 4.

Thus, the method described above in relation to FIG. 4 may yield more precise and more accurate results than the method described above in relation to FIG. 3. This result is achieved without having radiation analysis device 200 measure any more often or take more time traversing area of interest 300 than in the method of FIG. 3 and without reducing or otherwise modifying the detectable activity period. Of course, processing circuitry 206 may alternatively use other methods. For example, each portion of FIG. 3 could be divided into additional sections (e.g., three or four sections) with each section having a position.

The methods described above in relation to FIGS. 3 and 4 may be applied when an area of interest is traversed differently, for example, in columns or diagonally or otherwise, rather than in rows. Furthermore, other methods of combining two or more sets of radiation count data together where each of the sets is collected over a period of time that is smaller than the detectable activity period are also possible. For example, sets of radiation count data collected over a period of time smaller than the detectable activity period may be combined together even if radiation analysis device 200 does not travel at a constant rate while traversing an area of interest, radiation analysis device 200 does not traverse the area of interest in straight lines, or the area of interest is three dimensional rather than two dimensional. In one embodiment, data of adjoining sections are combined and a position may be at the boundary of the adjoining sections.

As was mentioned above, in detecting a selected radioactive material, a user of radiation analysis device 200 may be interested in gamma ray counts for gamma rays having an energy level associated with the selected radioactive material. In some cases, the user may be interested in a count of gamma rays having an energy level falling within a range of energy levels to determine whether a selected radioactive material is present. If a particular number of gamma rays having energy levels falling within the range of energy levels is received within a period of time equal to a detectable activity period of the selected radioactive material, the user may conclude that the selected radioactive material is present. After receiving the range of energy levels from the user, radiation analysis device 200 may count a number of gamma rays having energy levels falling within the range and alert the user if the count exceeds the particular number.

Figure 7:
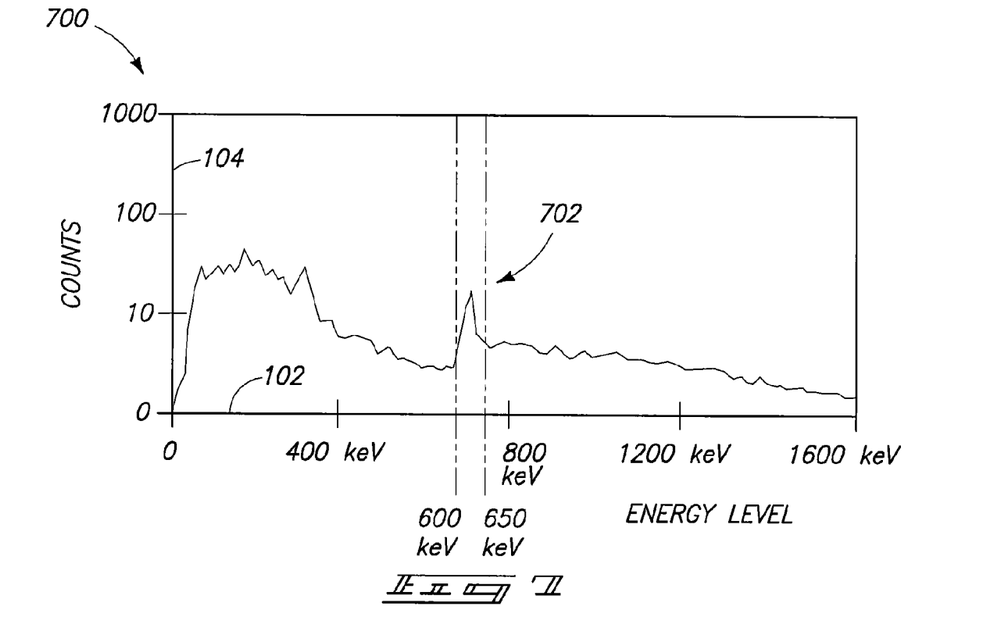
FIG. 7 is another chart illustrating radiation count data according to one embodiment.

Referring to FIG. 7, a chart 700 depicting a spectrum of radiation count data according to one embodiment is illustrated. Chart 700, like chart 100 discussed above in relation to FIG. 1, uses first axis 102 (representing energy levels) and second axis 104 (representing counts of gamma rays). Chart 700 also depicts a range of interest 702. Range of interest 702 includes energy levels between 600 keV and 650 keV.

In one embodiment, a user of radiation analysis device 200 may specify range of interest 702 by supplying radiation analysis device 200 with a description of range of interest 702 for detecting gamma rays of a selected radioactive material. For example, the description may specify the beginning energy level of range of interest 702 (i.e., 600 keV) and the ending energy level of range of interest 702 (i.e., 650 keV). Alternatively the description may specify the beginning energy level of range of interest 702 (i.e., 600 keV) and the width of range of interest 702 (i.e., 50 keV). The user may specify range of interest 702 because an energy level associated with a selected radioactive material may fall within range of interest 702.

Sensor 202 may have an overall range of energy levels over which sensor 202 may detect radiation. For example, sensor 202 may be able to detect radiation over an overall range of 0 keV to 1600 keV. Furthermore, sensor 202 may have a resolution. The resolution may characterize an ability of sensor 202 to distinguish a first gamma ray having a first energy level from a second gamma ray having a second energy level similar to the first energy level. For example, if sensor 202 has a resolution of 12.5 keV, sensor 202 may differentiate between a gamma ray having an energy level of 613 keV and a gamma ray having an energy level of 600 keV, but might not differentiate a gamma ray having an energy level of 613 keV from a gamma ray having an energy level of 610 keV.

The resolution of sensor 202 may, in some embodiments, vary based on an energy level being detected. For example, sensor 202 may have a resolution of 10 keV when detecting gamma rays having an energy level of 100 keV, may have a resolution of 100 keV for gamma rays having an energy level of 1500 keV, and may have resolutions between 10 keV and 100 keV for energy levels between 100 keV and 1500 keV.

Radiation analysis device 200 may use sensor 202 to determine an amount of radiation present in an overall range of energy levels by dividing the overall range into a set of channels. Individual channels may span a channel range bounded by a lower end and an upper end. For example, the 1600 keV overall range illustrated in FIG. 7 may be divided into 128 distinct channels each having a channel range of 12.5 keV. By way of example, one channel may have a lower end of 647 keV and an upper end of 650 keV.

Radiation analysis device 200 may use sensor 202 to detect radiation and may then determine which of the channels the detected radiation falls within (e.g., by counting a number of gamma rays having an energy level falling within the channel range of an individual channel that are received over a period of time).

Figure 8:
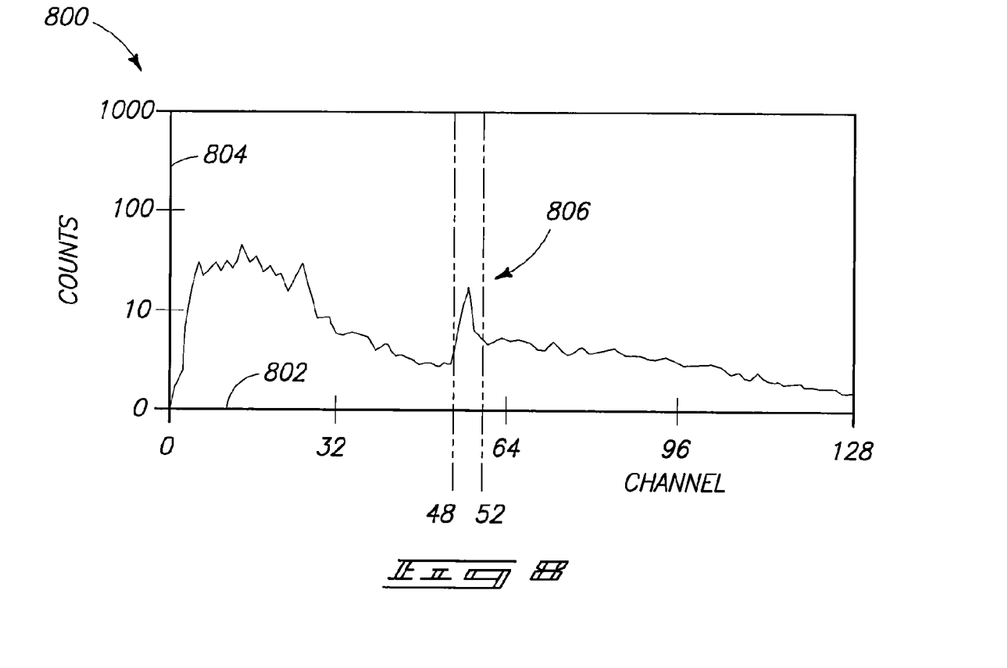
FIG. 8 is another chart illustrating radiation count data according to one embodiment.

Referring to FIG. 8, a chart 800 depicting a spectrum of radiation count data according to one embodiment is illustrated. A first axis 802 of chart 800 represents channel numbers. Axis 802, in one embodiment, ranges from channel 0 to channel 128. A second axis 804 of chart 800 represents a count of gamma rays having a particular energy level falling within one of the channels of axis 802. By way of example, a count for channel 10 represents the number of gamma rays having an energy level falling within a range of 112.5 keV to 125 keV detected by sensor 202. The count may be based on the resolution of sensor 202 for the channel range of channel 10.

Chart 800 also depicts a range of interest 806. Range of interest 806 may, in one embodiment, correspond with range of interest 702. In one embodiment, processing circuitry 206 may determine range of interest 806 based on range of interest 702. For example, processing circuitry 206 may determine that an energy level of 600 keV (the beginning energy level of range of interest 702) corresponds at one moment in time with the upper end of channel 48 of radiation analysis device 200 based on the channel range of radiation analysis device 200 (12.5 keV in this example) and the range of radiation analysis device 200 (1600 keV in this example). In some embodiments, processing circuitry 206 may further use a calibration offset in determining channel numbers corresponding to range of interest 806. Processing circuitry 206 may similarly determine that an energy level of 650 keV (the ending energy level of range of interest 702) corresponds, at the one moment in time, with the upper end of channel 52 of radiation analysis device 200.

In one embodiment, processing circuitry 206 may determine the channel numbers associated with range of interest 806 for operational convenience since radiation analysis device 200 may store radiation count data based on channel number rather than on energy level. Accordingly, when performing operations using the radiation count data, processing circuitry 206 may operate using channel numbers rather than energy levels.

However, a user of radiation analysis device 200 may prefer to interact with radiation analysis device 200 using values specified in units of energy level rather than using values specified in channel numbers because the user might not know which channel numbers are associated with range of interest 806. Accordingly, radiation analysis device 200 may present information to the user and receive information from the user in units of energy level rather than channel numbers.

After determining the channel numbers associated with range of interest 702, radiation analysis device 200 may count a number of gamma rays having an energy level falling within one of the channels of range of interest 806 within a detectable activity period. In one embodiment, the count may be stored in storage circuitry 204. If the count is greater than or equal to a particular number associated with the selected radioactive material, radiation analysis device 200 may alert the user.

From time to time, radiation analysis device 200 may be calibrated. Calibration may compensate for temperature or other effects that may influence the accuracy of radiation analysis device 200. In one embodiment, radiation analysis device 200 may be calibrated by exposing sensor 202 to a known source of radiation having a known energy level and counting gamma rays emitted by the known source of radiation. Next, radiation analysis device 200 may determine one or more correction factors based on a difference between a measured energy level of the known source and the known energy level of the known source. In other words, if radiation analysis device 200 reports an energy level for the known source that is incorrect, processing circuitry 206 may determine and apply a correction factor so that radiation analysis device 200 reports a correct energy level for the known source. Other methods of calibration that generate one or more correction factors may alternatively be used.

For example, upon performing a calibration, radiation analysis device 200 may determine that the upper end of channel 50 corresponds with 600 keV rather than the upper end of channel 48 as illustrated in FIG. 8. Accordingly, radiation analysis device 200 may apply a correction factor of two channels. This correction factor may compensate for a change in temperature or other environmental factor in one embodiment.

Figure 9:
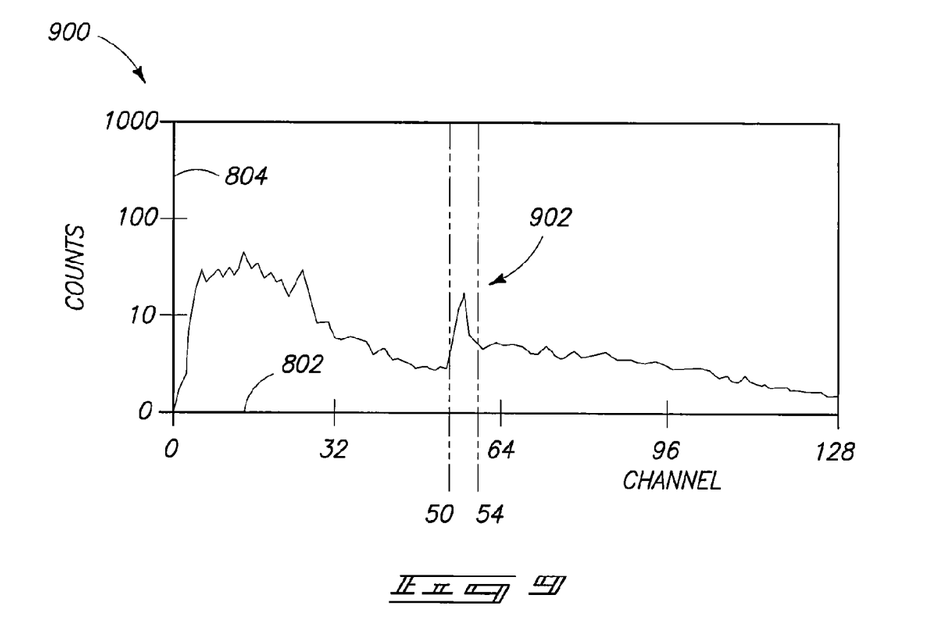
FIG. 9 is another chart illustrating radiation count data according to one embodiment.

Referring to FIG. 9, a chart 900 depicting a spectrum of radiation count data according to one embodiment is illustrated. Chart 900, like chart 800 discussed above in relation to FIG. 8, uses first axis 802 (representing channel numbers) and second axis 804 (representing counts of gamma rays).

Chart 900 also depicts a range of interest 902. Range of interest 902 corresponds to energy levels 600 keV through 650 keV (i.e., range of interest 702) and is specified in channel numbers, namely channels 51-54. However, this range of channel numbers, 51-54, is different from the range of channel numbers of range of interest 806 (49-52) even though range of interest 806 and range of interest 902 both correspond to energy levels 600 keV through 650 keV. This result is due to a correction factor of two channels having been applied to range of interest 902.

After updating the channel numbers based on the correction factor resulting from the calibration, radiation analysis device 200 may count a number of gamma rays having an energy level falling within one of the channels of range of interest 902 within a detectable activity period. In one embodiment, the count may be stored in storage circuitry 204. If the count is greater than or equal to a particular number associated with the selected radioactive material, radiation analysis device 200 may alert the user.

In one embodiment, radiation analysis device 200 may perform a calibration during a detectable activity period rather than at the end of a detectable activity period. Consequently, gamma rays received during a first portion of the detectable activity period may be analyzed using the channel numbers associated with range of interest 806 and gamma rays received during a second portion of the detectable activity period may be analyzed using the channel numbers associated with range of interest 902. In this case, radiation analysis device 200 may add a count associated with the first portion to a count associated with the second portion to determine a count for the detectable activity period.

Figure 10:
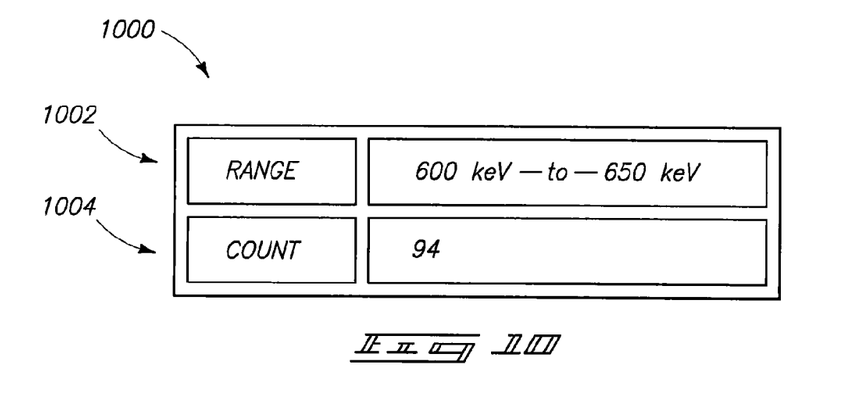
FIG. 10 is a chart illustrating radiation count data for a range of interest according to one embodiment.

Referring to FIG. 10, a chart 1000 illustrating a radiation count for a range of interest, according to one embodiment, is illustrated. By way of example, radiation analysis device 200 may display the contents of chart 1000 to a user while the user is operating radiation analysis device 200. Chart 1000 includes a range indicator 1002, which depicts a selected range of energy levels to be monitored. In one embodiment, the range of energy levels is specified in units of keV. Chart 1000 also includes a count indicator 1004, which depicts a number of gamma rays having an energy level falling within the range specified by range indicator 1002 during a particular detectable activity period.

In one embodiment, radiation analysis device 200 may subtract a known background activity count from count indicator 1004 prior to displaying count indicator 1004 to a user. The background activity count may represent a background level of radiation known to be present in an area being analyzed by radiation analysis device 200. In this embodiment, the resulting count may be referred to as a net activity count.

In one embodiment, a user may select range of interest 702 so that range of interest 702 includes a peak in the spectrum of radiation count data. The peak may represent a particular radioactive material. The user may be interested in determining how much of the particular radioactive material is present within an area. The user may select range of interest 702 so that upper and lower ends of range of interest 702 intersect the spectrum of radiation count data at energy levels believed by the user to correspond with the background activity count. In some cases, the peak may be centered within range of interest 702 once the upper and lower ends of range of interest 702 are selected to be at counts corresponding to the background activity count.

In some cases, a count at which a lower end of range of interest 702 intersects the spectrum may be approximately the same as a count at which an upper end of range of interest 702 intersects the spectrum. Radiation analysis device 200 may use the counts at the lower end of range of interest 702 and the upper end of range of interest 702 to determine the background activity count for range of interest 702, which may then be subtracted from a total count of range of interest 702, resulting in a net activity count for range of interest 702.

Using the correction factors described above, radiation analysis device 200 may keep a peak centered within range of interest 702 thereby increasing the accuracy of the net activity count. In contrast, if calibrations are not performed and correction factors are not determined, the peak may drift over time towards the upper or lower end of range of interest 702 distorting the background activity count and therefore distorting the net activity count as well.

In one embodiment, radiation analysis device 200 presents the information of chart 1000 to a user and does not present channel numbers corresponding to the range specified by range indicator 1002. In fact, the channels number corresponding to the range specified by range indicator 1002 may change over time based on calibrations as was discussed above. In one embodiment, a user of radiation analysis device 200 may not be aware that a calibration, and any resulting changes in channel numbers corresponding to a range of interest, has occurred. Accordingly, calibration and channel number changes may be transparent to the user.

Since a user may specify a range of interest to radiation analysis device 200 (as was described above) in terms of energy levels (e.g., keV) and may view count results for the range of interest in terms of energy levels (e.g., keV) as illustrated by range indicator 1002, the user need not interact with radiation analysis device 200 using channel numbers. Instead, references to channel numbers may be limited to processing within radiation analysis device 200 in one embodiment. Accordingly, the user need not be aware of channel numbers when interacting with radiation analysis device 200.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose, and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

The invention claimed is:

1. A radiation analysis device comprising:
   at least one sensor configured to detect respective radiation count data for a plurality of sections of an area of interest; and
   circuitry configured to combine an amount of the radiation count data detected by the at least one sensor for at least one section of the plurality of sections that is insufficient to determine whether a selected radioactive material is present in the at least one section of the plurality of sections with another amount of the radiation count data detected by the at least sensor for at least one other section of the plurality of sections that is insufficient to determine whether the selected radioactive material is present in the at least one other section of the plurality of sections to determine whether the selected radioactive material is present in the area of interest.

2. The device of claim 1, wherein the circuitry is further configured to determine whether the selected radioactive material is present near a plurality of positions within the area of interest using, for each position of the plurality of positions, the radiation count data from the plurality of sections.

3. The device of claim 2, wherein for one position of the plurality of positions, the circuitry is further configured to use the radiation count data from one section of the plurality of sections including the position of the plurality of positions and from another section of the plurality sections that is immediately adjacent to the one section.

4. The device of claim 2, wherein the circuitry is further configured to determine the radiation count data of at least one position of the plurality of positions by combining the radiation count data from at least two sections of the plurality of sections that are nearest to the at least one position of the plurality of positions.

5. The device of claim 2, wherein the circuitry is further configured to use the radiation count data from one section of the plurality of sections in determining whether the selected radioactive material is present near two or more positions of the plurality of positions.

6. The device of claim 1, wherein the circuitry is further configured to combine the radiation count data from at least two sections of the plurality of sections that in combination has been collected over a period at least as long as a detectable activity period of the selected radioactive material, the detectable activity period being a minimum amount of time wherein sufficient radiation may be received to detect a particular amount of the selected radioactive material.

* * * * *